US012572148B2

(12) United States Patent
Xie

(10) Patent No.: US 12,572,148 B2
(45) Date of Patent: Mar. 10, 2026

(54) METHOD FOR DETECTING OBSTACLE, SELF-MOVING ROBOT, AND NON-TRANSITORY COMPUTER READABLE STORAGE MEDIUM

(71) Applicant: BEIJING ROBOROCK INNOVATION TECHNOLOGY CO., LTD., Beijing (CN)

(72) Inventor: Haojian Xie, Beijing (CN)

(73) Assignee: BEIJING ROBOROCK INNOVATION TECHNOLOGY CO. LTD., Beiijng (CN)

( * ) Notice: Subject to any disclaimer, the term of this patent is extended or adjusted under 35 U.S.C. 154(b) by 298 days.

(21) Appl. No.: 18/023,221

(22) PCT Filed: Apr. 8, 2021

(86) PCT No.: PCT/CN2021/085960
§ 371 (c)(1),
(2) Date: Feb. 24, 2023

(87) PCT Pub. No.: WO2022/041740
PCT Pub. Date: Mar. 3, 2022

(65) Prior Publication Data
US 2023/0305573 A1     Sep. 28, 2023

(30) Foreign Application Priority Data

Aug. 26, 2020    (CN) .......................... 202010872327.3

(51) Int. Cl.
G05D 1/00          (2024.01)
G06T 1/00          (2006.01)
(Continued)

(52) U.S. Cl.
CPC ......... G05D 1/0251 (2013.01); G05D 1/0214 (2013.01); G06T 1/0014 (2013.01);
(Continued)

(58) Field of Classification Search
CPC .. A47L 2201/04; A47L 9/2805; A47L 9/2852; G05D 1/0214; G05D 1/024;
(Continued)

(56) References Cited

U.S. PATENT DOCUMENTS

| | | | | |
|---|---|---|---|---|
| 10,222,805 B2 * | 3/2019 | Munich | ................ | G05D 1/0274 |
| 10,688,652 B2 * | 6/2020 | Hummel | ............... | A47L 9/2894 |

(Continued)

FOREIGN PATENT DOCUMENTS

| | | |
|---|---|---|
| CN | 104236548 A | 12/2014 |
| CN | 105204510 A | 12/2015 |

(Continued)

OTHER PUBLICATIONS

Japanese Office Action dated Nov. 14, 2023 in co-pending Japanese Patent Application No. 2023-513541.

(Continued)

*Primary Examiner* — Babar Sarwar
(74) *Attorney, Agent, or Firm* — Thomas Horstemeyer, LLP

(57)          ABSTRACT

A method for detecting an obstacle, applied to a self-moving robot, including: transforming obstacle information into depth information; converting the depth information into a point cloud map, and determining coordinate data of a reference point on the obstacle; determining a valid analysis range in a height direction in the point cloud map; and determining, based on the coordinate data of the reference point, whether an obstacle is present within the valid analysis range.

15 Claims, 7 Drawing Sheets

(51) Int. Cl.

| | |
|---|---|
| *G06T 7/11* | (2017.01) |
| *G06T 7/50* | (2017.01) |
| *G06T 7/62* | (2017.01) |
| *G06T 7/80* | (2017.01) |

(52) U.S. Cl.
CPC ................. *G06T 7/11* (2017.01); *G06T 7/50* (2017.01); *G06T 7/62* (2017.01); *G06T 7/85* (2017.01); *G06T 2207/10028* (2013.01); *G06T 2207/20076* (2013.01); *G06T 2207/30261* (2013.01)

(58) Field of Classification Search
CPC ...... G05D 1/0251; G06V 20/10; G06V 20/58; G06T 1/0014; G06T 2207/10028; G06T 2207/20076; G06T 2207/30261; G06T 7/11; G06T 7/50; G06T 7/62; G06T 7/85
See application file for complete search history.

(56) References Cited

U.S. PATENT DOCUMENTS

| | | | | |
|---|---|---|---|---|
| 10,725,477 | B2 * | 7/2020 | Nan ........................... | A47L 9/00 |
| 11,199,853 | B1 * | 12/2021 | Afrouzi .................. | B25J 13/006 |
| 2008/0279422 | A1 | 11/2008 | Matsuzawa | |
| 2016/0309975 | A1 | 10/2016 | Lindhé et al. | |
| 2017/0357267 | A1 * | 12/2017 | Foster .................. | G01C 21/005 |
| 2018/0020893 | A1 | 1/2018 | Lee et al. | |
| 2018/0190014 | A1 * | 7/2018 | Yarborough ............ | G06T 17/05 |
| 2019/0008347 | A1 * | 1/2019 | Senoo .................. | G05D 1/0255 |
| 2019/0014960 | A1 | 1/2019 | Ebrahimi Afrouzi et al. | |
| 2019/0035099 | A1 | 1/2019 | Afrouzi et al. | |
| 2019/0120633 | A1 * | 4/2019 | Afrouzi ............... | A47L 11/4011 |
| 2019/0204851 | A1 | 7/2019 | Afrouzi et al. | |
| 2019/0227566 | A1 | 7/2019 | Marutani et al. | |
| 2019/0250625 | A1 | 8/2019 | Kleiner et al. | |
| 2019/0266736 | A1 | 8/2019 | Kulkarni et al. | |
| 2020/0089970 | A1 | 3/2020 | Lee et al. | |
| 2020/0209880 | A1 | 7/2020 | Bai et al. | |
| 2020/0241554 | A1 * | 7/2020 | Takahashi ............ | G05D 1/0274 |
| 2021/0149411 | A1 | 5/2021 | Zang | |

FOREIGN PATENT DOCUMENTS

| | | | | | |
|---|---|---|---|---|---|
| CN | 107491070 | A | 12/2017 | | |
| CN | 107928566 | A | 4/2018 | | |
| CN | 107966989 | A | 4/2018 | | |
| CN | 108663681 | A | * 10/2018 | ............ | G01S 17/93 |
| CN | 108983248 | A | 12/2018 | | |
| CN | 109645892 | A | 4/2019 | | |
| CN | 109645897 | A | * 4/2019 | ......... | A47L 11/4008 |
| CN | 109814564 | A | 5/2019 | | |
| CN | 110045376 | A | 7/2019 | | |
| CN | 110070570 | A | 7/2019 | | |
| CN | 110275540 | A | 9/2019 | | |
| CN | 105744872 | B | 1/2020 | | |
| CN | 10799989 | A | 2/2020 | | |
| CN | 110928301 | A | 3/2020 | | |
| CN | 111260773 | A | 6/2020 | | |
| CN | 111329398 | A | 6/2020 | | |
| CN | 111521184 | A | * 8/2020 | .......... | G05D 1/0214 |
| CN | 111990929 | A | 11/2020 | | |
| JP | 1997-222852 | A2 | 8/1997 | | |
| JP | 2004033340 | A | 2/2004 | | |
| JP | 5452442 | B2 | 3/2014 | | |
| JP | 2016065842 | A | 4/2016 | | |
| JP | 2018-057615 | A2 | 4/2018 | | |
| JP | 2019126427 | A | 8/2019 | | |
| KR | 20090018336 | A | 2/2009 | | |
| RU | 2313269 | C2 | 12/2007 | | |
| RU | 2673857 | C1 | 11/2018 | | |
| WO | WO2010114235 | A1 | 10/2010 | | |
| WO | 2016047201 | A1 | 3/2016 | | |
| WO | 2018101631 | A | 6/2018 | | |
| WO | 2020049650 | A1 | 3/2020 | | |
| WO | 2021147548 | A1 | 7/2021 | | |

OTHER PUBLICATIONS

Russian Office Action dated Oct. 6, 2023 in co-pending Russian Patent Application No. 203106200.

Dial, R.L., "A Novel Low-Cost Autonomous 3D Lidar System", University of Alaska Fairbanks, 2018, <URL: https://core.ac.uk/download/pdf/286999062.pdf.

Madhavan T.R. et al., "Obstacle Detection and Obstacle Avoidance Algorithm based on 2-D RPLiDAR," 2019 Int. Conference on Computer Communication and Informatics (ICCCI), 2019, pp. 1-4, <DOI: 10.1109/ICCCI.2019.8821803.

Australian Office Action dated Oct. 6, 2023 in co-pending Australian Patent Application No. 2023201499.

IN202337015999—1st Office Action.

Second Office Action mailed Jun. 3, 2023 in co-pending Chinese Patent Application No. 202210193181.9.

International Search Report dated Jun. 16, 2021 in co-pending PCT Application No. PCT/CN2021/085960 filed Apr. 8, 2021.

Office Action dated May 25, 2021 in co-pending Chinese Patent Application No. 202010872327.3 filed Aug. 26, 2 2020.

2nd Australian Office Action dated Jan. 31, 2024 (AU Application No. 2023201499).

Real-Time Obstacle Detection and Avoidance in the Presence of Specular Surfaces Using an Active 3D Sensor.

EP21859589.0 Extended European Search Report.

RU2024111630—1st Office Action.

JP2024-073586—Notice of Allowance with English Translation.

Office Action for Korean Application No. 10-2023-7008255.

Hearing Notice for Indian Application No. 202337015999.

\* cited by examiner

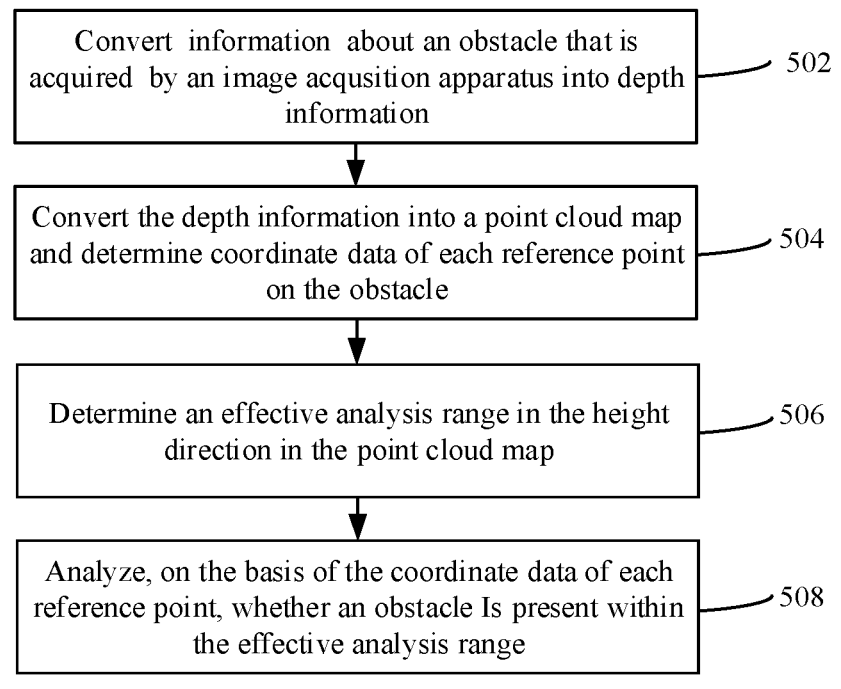

| | |
|---|---|
| Convert information about an obstacle that is acquired by an image acqusition apparatus into depth information | 502 |
| Convert the depth information into a point cloud map and determine coordinate data of each reference point on the obstacle | 504 |
| Determine an effective analysis range in the height direction in the point cloud map | 506 |
| Analyze, on the basis of the coordinate data of each reference point, whether an obstacle Is present within the effective analysis range | 508 |

FIG. 5

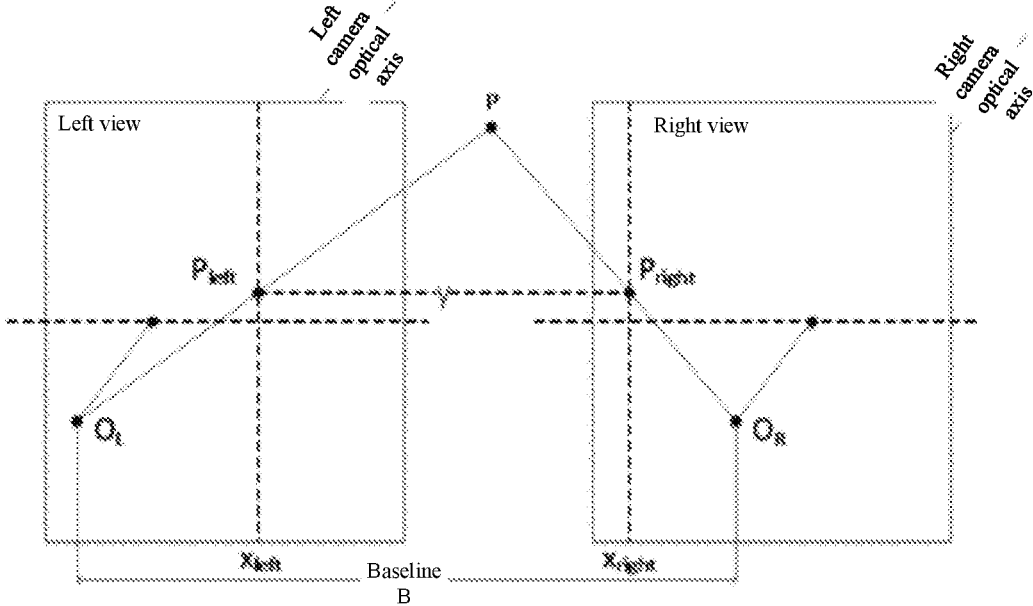

FIG. 6

METHOD FOR DETECTING OBSTACLE, SELF-MOVING ROBOT, AND NON-TRANSITORY COMPUTER READABLE STORAGE MEDIUM

CROSS-REFERENCE TO RELATED APPLICATIONS

This application is a US national phase of a PCT application under PCT/CN2021/085960, which claims priority to Chinese Patent Application No. 202010872327.3, filed on Aug. 26, 2020, both of which are incorporated herein by reference in their entireties.

TECHNICAL FIELD

The present disclosure relates to the technical field of self-moving robots, and in particular, to a method for detecting an obstacle, an apparatus, a self-moving robot, and a storage medium.

BACKGROUND

With the development of artificial intelligence technologies, various intelligent robots appear, such as a sweeping robot, a mopping robot, a vacuum cleaner, and a weeder, etc. These cleaning robots are capable of automatically identifying obstacles around them and performing operations of obstacle avoidance during operation. These cleaning robots not only liberate the labor force, reduce labor costs, but also improve cleaning efficiency.

However, an image acquisition apparatus of an existing sweeping robot can identify only limited types of obstacles. Usually, a photographed obstacle image is matched with a previous image stored in a database. When succeeding in matching, a photographed target is identified as a specific type of an obstacle, such as a shoe. In addition, the sweeping robot may further identify an obstacle by using a laser device. However, the laser device is usually disposed on the top surface of the sweeping robot, and the laser device emits and receives signals in the horizontal direction to identify an obstacle around the sweeping robot. As the sweeping robot itself has a certain height and the laser device also has a certain height, the laser device can only detect an obstacle of a height higher than the height of the sweeping robot, resulting that some low-height obstacles to be touched by mistake and the user experience is poor.

SUMMARY

In view of this, embodiments of the present disclosure provide a method for detecting an obstacle, an apparatus, a self-moving robot, and a storage medium, so that the self-moving robot can avoid any obstacle within a specific height range.

According to an aspect of the present disclosure, there is provided a method for detecting an obstacle, applied to a self-moving robot, including: transforming obstacle information acquired by an image acquisition apparatus into depth information; converting the depth information into a point cloud map, and determining coordinate data of each reference point on the obstacle; selecting a valid analysis range in a height direction in the point cloud map; and analyzing, within the valid analysis range based on the coordinate data of each the reference point, whether an obstacle is present within the valid analysis range.

Optionally, the analyzing, within the valid analysis range based on the coordinate data of each the reference point, whether the obstacle is present within the valid analysis range includes: transforming 3D coordinate data of each the reference point within the valid analysis range into 2D coordinate data; and analyzing, within the valid analysis range based on the 2D coordinate data of each the reference point, whether the obstacle is present within the valid analysis range.

Optionally, the analyzing, within the valid analysis range based on the 2D coordinate data of each the reference point, whether the obstacle is present within the valid analysis range includes: obtaining a probability map formed in a traveling process of the self-moving robot; and filtering out coordinate data of a noise point in the 2D coordinate data of each the reference point based on the probability map, and analyzing whether the obstacle is present within the valid analysis range based on filtered 2D coordinate data of each the reference point.

Optionally, the filtering out coordinate data of the noise point in the 2D coordinate data of each the reference point based on the probability map includes: obtaining location coordinate data of the obstacle in the probability map, where a probability value of the obstacle in the probability map is greater than a preset probability threshold; and comparing the location coordinate data of the obstacle with the 2D coordinate data of each the reference point, and filtering out the 2D coordinate data when a distance between the location coordinate data of the obstacle and the 2D coordinate data of each the reference point is greater than a preset value.

Optionally, the analyzing, within the valid analysis range based on the 2D coordinate data or 3D coordinate data of each the reference point, whether the obstacle is present within the valid analysis range includes: clustering each the reference point within the valid analysis range, and determining all reference points with a distance from coordinate data of an adjacent reference point less than a second preset value as a region; and determining a size of each region respectively; and if the size is greater than or equal to a third preset value, determining that the obstacle is present within the valid analysis range.

Optionally, the size of the region includes at least one of the following: an area/volume of the region, a diameter of the region, or a minimum distance across a geometric center of the region.

Optionally, after the analyzing whether the obstacle is present within the valid analysis range, the method includes: when the obstacle is present within the valid analysis range, determining whether the size of the obstacle is less than a preset threshold; and when the size of the obstacle is less than the preset threshold, controlling the self-moving robot to reduce a rotation speed of a side brush within a preset distance range from the obstacle.

According to an aspect of the present disclosure, there is provided a method for detecting an obstacle, applied to a self-moving robot, including: transforming obstacle information acquired by an image acquisition apparatus into depth information; converting the depth information into a point cloud map, and selecting a valid analysis range in the point cloud map; and if it is determined that an obstacle is present within the valid analysis range, performing navigation according to a size of the obstacle.

Optionally, the performing navigation according to the size of the obstacle specifically includes: when the size of the obstacle is less than a preset threshold, controlling the self-moving robot to reduce a rotation speed of a side brush within a preset distance range from the obstacle.

Optionally, the performing navigation according to the size of the obstacle specifically includes: determining an obstacle avoidance distance according to the size of the obstacle or a range where the size is located, and controlling the self-moving robot to start to perform an obstacle avoidance strategy at the obstacle avoidance distance.

Optionally, after the converting the depth information into the point cloud map, the method further includes:

determining coordinate data of each reference point on the obstacle;

clustering each the reference point within the valid analysis range, and determining all reference points with a distance from coordinate data of an adjacent reference point less than a second preset value as a region; determining a size of each region respectively; and if the size of the region is greater than or equal to a third preset value, determining that the obstacle is present within the valid analysis range.

Optionally, the size of the region includes at least one of the following: an area/volume of the region, a diameter of the region, a minimum distance across a geometric center of the region, or a height of the region.

Optionally, the performing navigation according to the size of the obstacle specifically includes: if it is determined that a height of the obstacle is greater than a preset height, performing an obstacle avoidance strategy.

According to an aspect of the present disclosure, there is provided a self-moving robot, including a processor and a memory, where the memory stores with a computer program instruction executable by the processor, and when the processor executes the computer program instruction, steps of the foregoing method are implemented.

According to an aspect of the present disclosure, there is provided a non-transitory computer readable storage medium, where a computer program instruction is stored, and when the computer program instruction is invoked and executed by a processor, steps of the foregoing method are implemented.

Compared with the related art, the present invention has at least the following technical effects:

According to embodiments of the present disclosure, there is provided a method for detecting an obstacle, an apparatus, a self-moving robot, and a storage medium, where, in the method for detecting an obstacle, a depth image in a certain height range is obtained by the self-moving robot itself, processing such as coordinate transformation and data clustering is performed on the depth image, so as to accurately determine whether an obstacle is present within the current depth image or not. In the method, any object in a traveling route of the self-moving robot can be detected, which breaks through a limitation on types of obstacles in the existing method. In addition, a defect in a detection height of a laser device is remedied, so that a capability of detecting an obstacle by the self-moving robot is further improved, and obstacle avoidance performance of the self-moving robot is increased.

BRIEF DESCRIPTION OF DRAWINGS

In order to describe the technical solutions in the embodiments of the present disclosure or in the related art more clearly, the following briefly describes the accompanying drawings needed for describing the embodiments or the related art. Clearly, the accompanying drawings in the following description show some embodiments of the present disclosure, and a person of ordinary skill in the art can still derive other drawings from these accompanying drawings without creative efforts.

Figure 1:
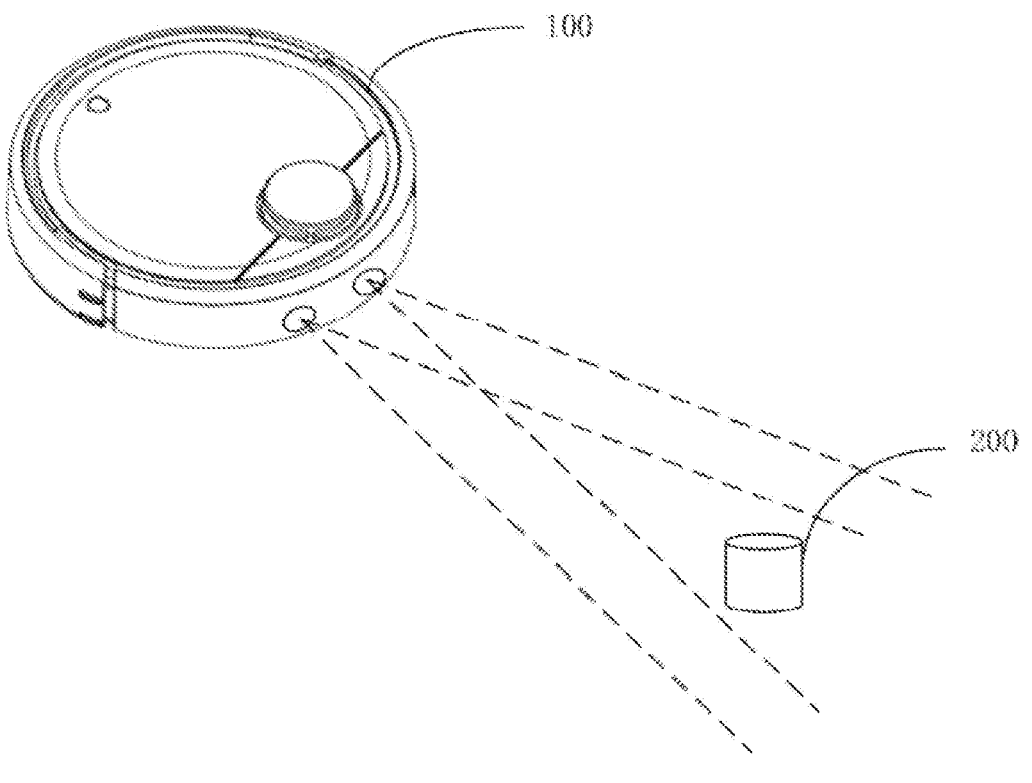
Figure 2:
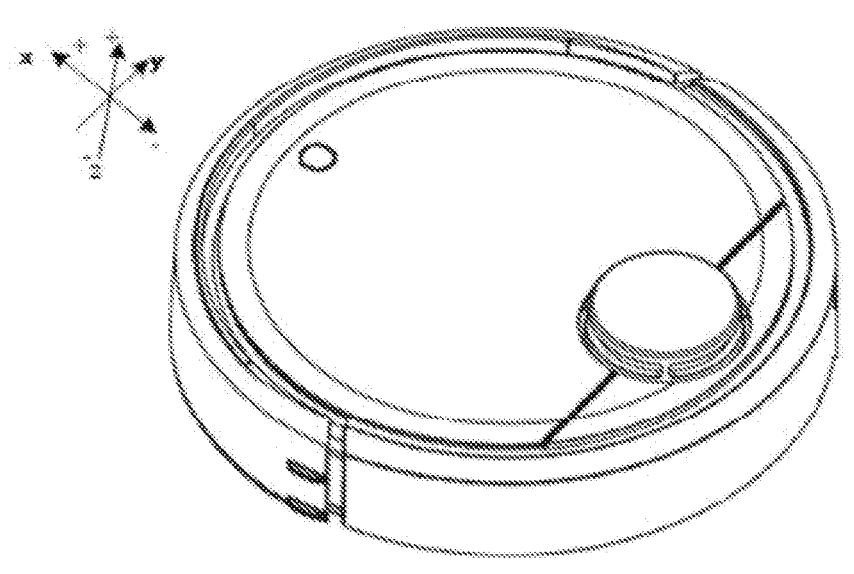
Figure 3:
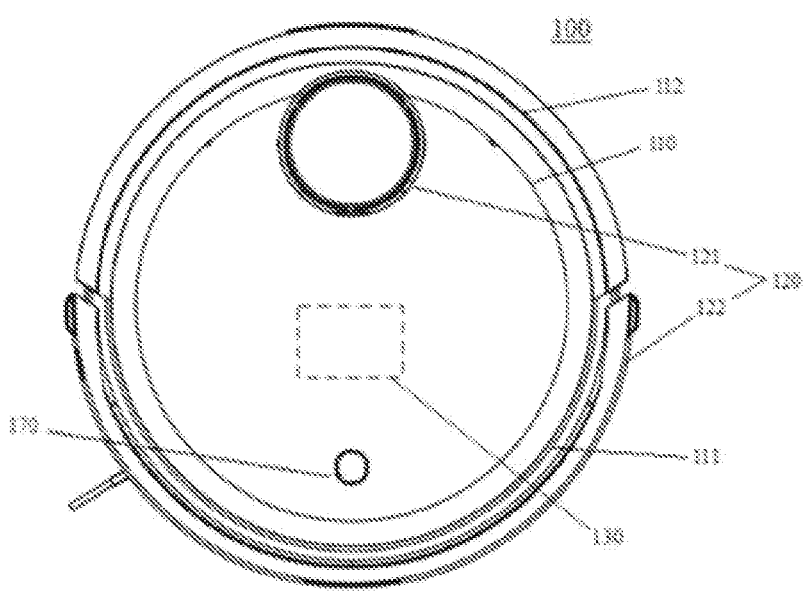
Figure 4:
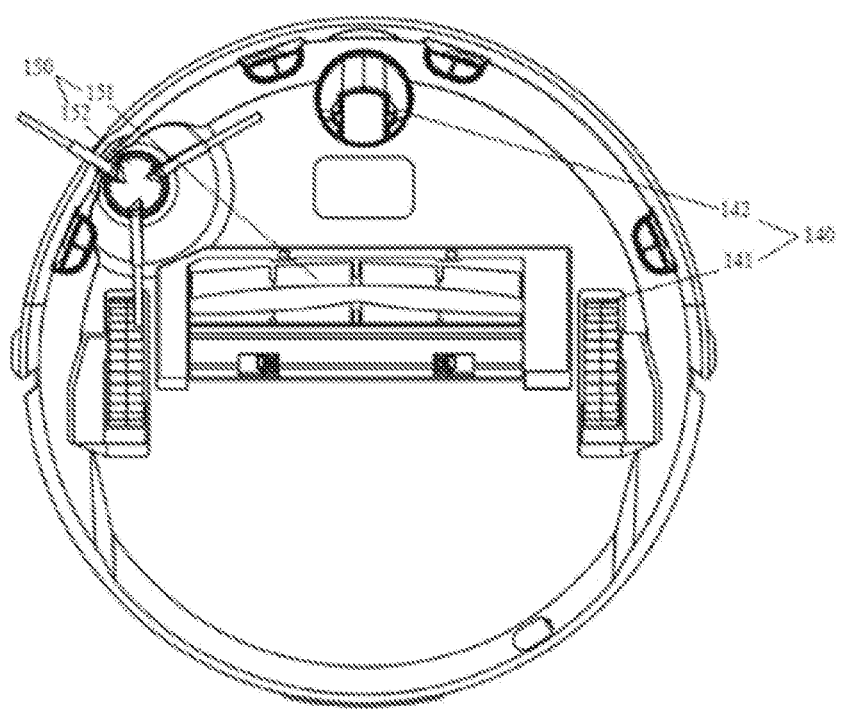
Figure 7:
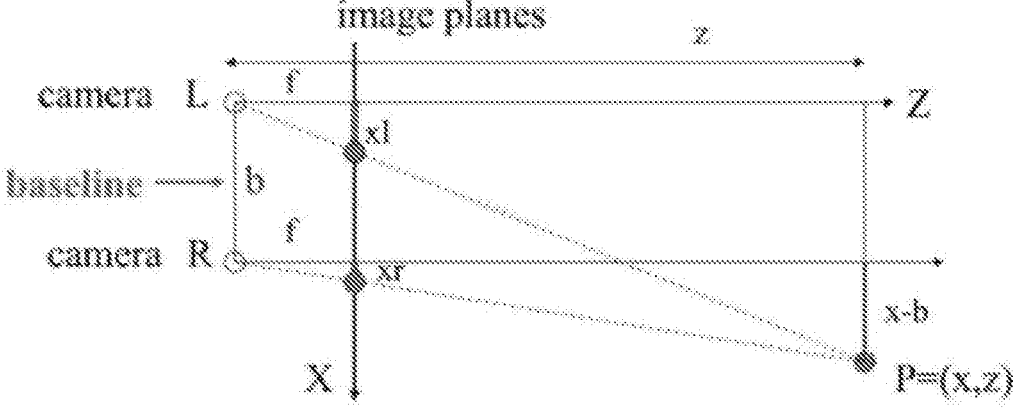
Figure 8:
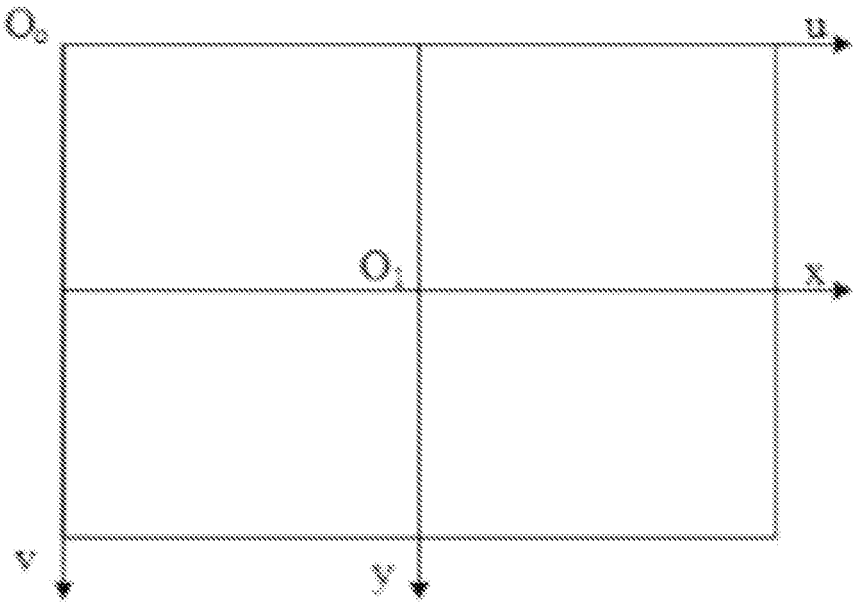
Figure 9:
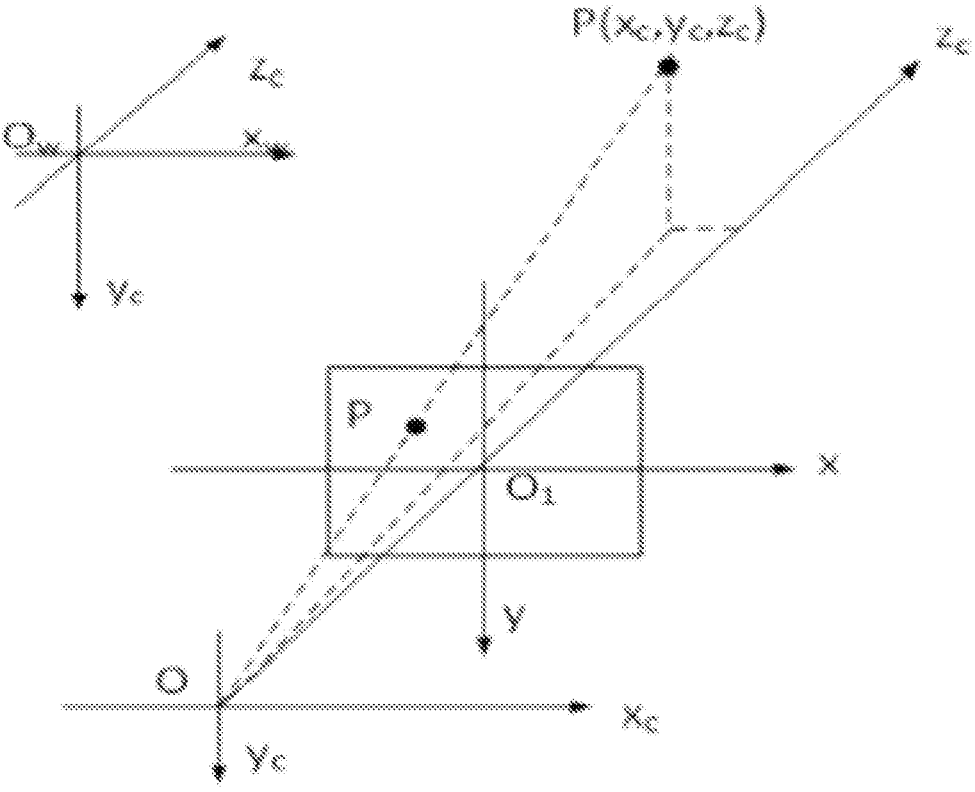
Figure 10:
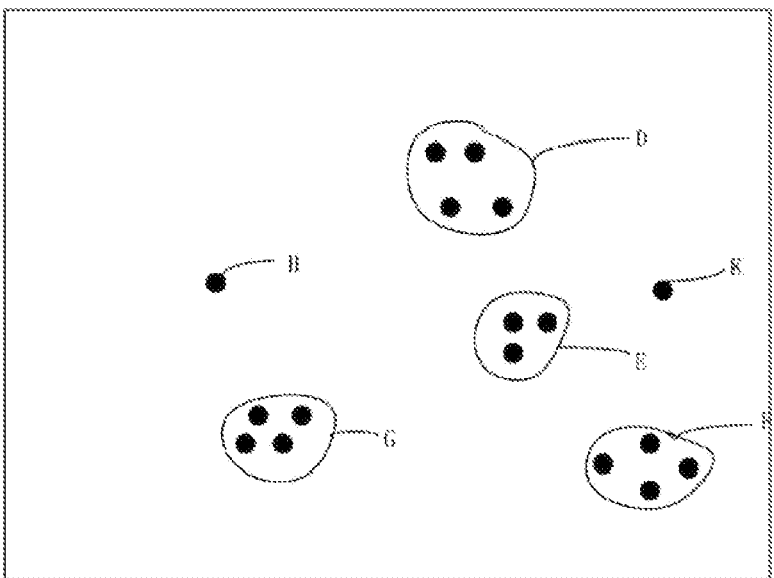
Figure 11:
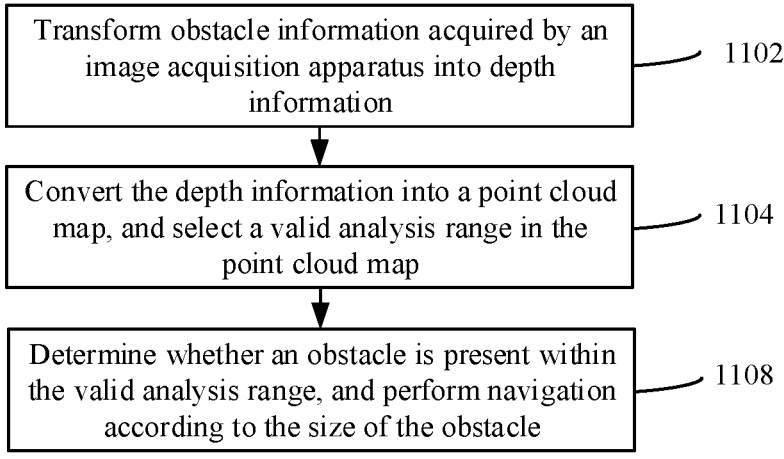
Figure 12:
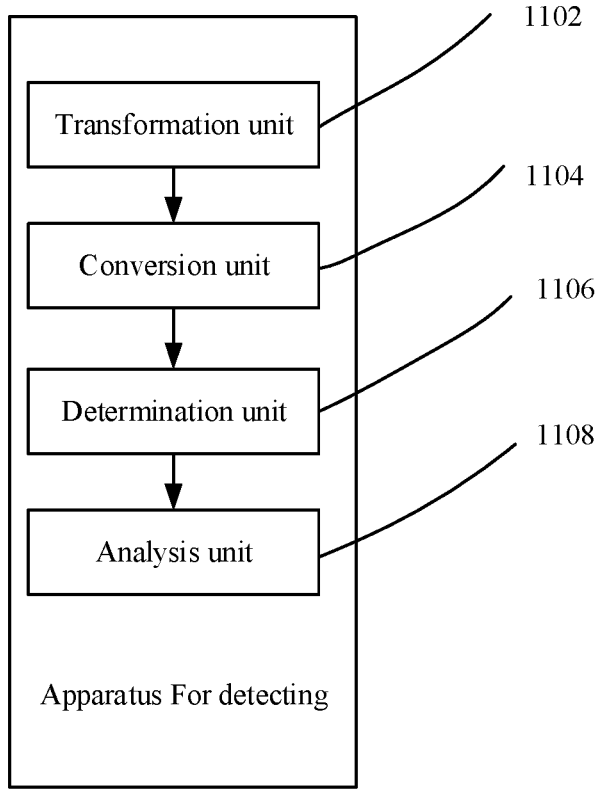
Figure 13:
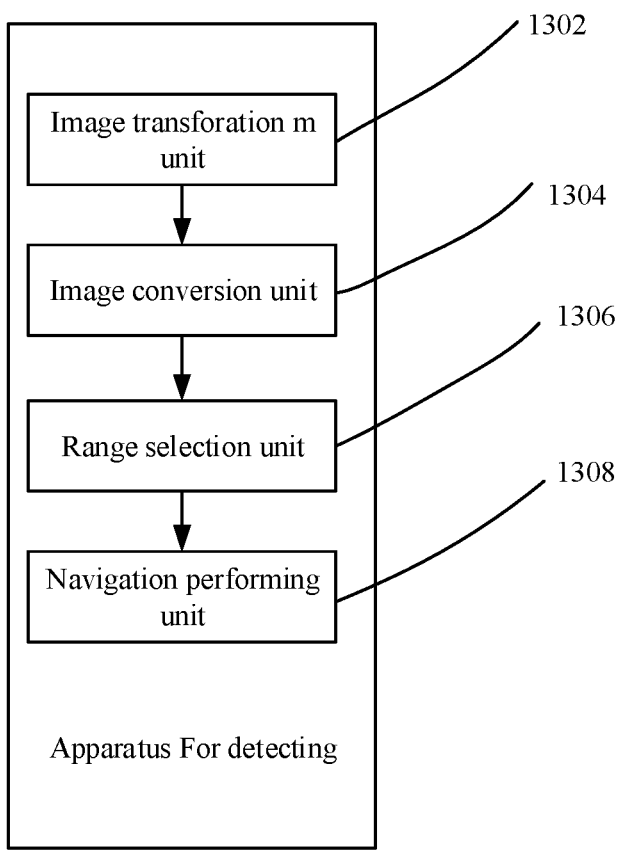
Figure 14:
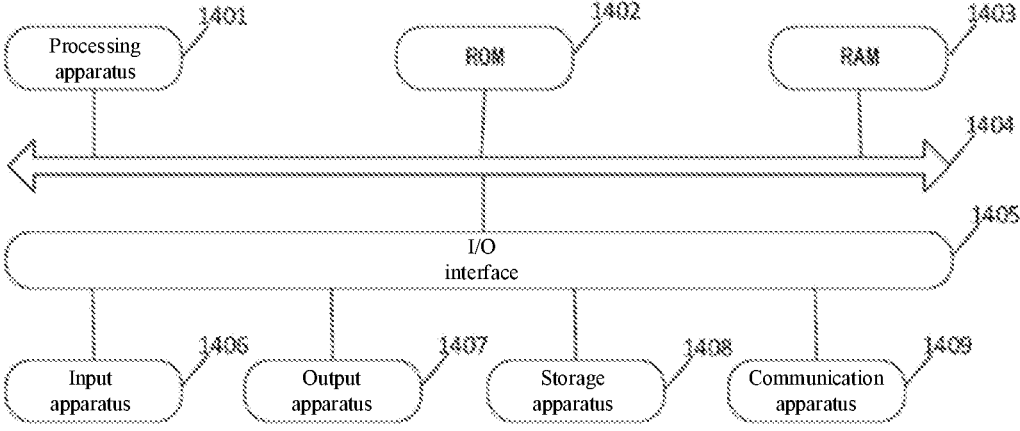

FIG. 1 is a schematic diagram of an application scenario according to an embodiment of the present disclosure;

FIG. 2 is a three-dimensional view of a structure of a self-moving robot according to an embodiment of the present disclosure;

FIG. 3 is a top view of a structure of a self-moving robot according to an embodiment of the present disclosure;

FIG. 4 is a bottom view of a structure of a self-moving robot according to an embodiment of the present disclosure;

FIG. 5 is a schematic flowchart of a method for detecting an obstacle for a self-moving robot according to an embodiment of the present disclosure;

FIG. 6 is a structural diagram of principle of binocular range finding according to an embodiment of the present disclosure;

FIG. 7 is a schematic diagram of geometry structure of binocular range finding according to an embodiment of the present disclosure;

FIG. 8 is a schematic diagram of a plane coordinate system according to an embodiment of the present disclosure;

FIG. 9 is a schematic diagram of a three-dimensional coordinate system according to an embodiment of the present disclosure;

FIG. 10 is a schematic flowchart of a method for clustering according to an embodiment of the present disclosure;

FIG. 11 is a schematic flowchart of a method for detecting an obstacle for a self-moving robot according to another embodiment of the present disclosure;

FIG. 12 is a schematic structural diagram of an apparatus for detecting an obstacle according to an embodiment of the present disclosure;

FIG. 13 is a schematic structural diagram of an apparatus for detecting an obstacle according to another embodiment of the present disclosure; and FIG. 14 is a schematic diagram of an electronic structure of a robot according to an embodiment of the present disclosure.

DESCRIPTION OF EMBODIMENTS

To make the objectives, technical solutions, and advantages of the embodiments of the present disclosure clearer, the technical solutions in the embodiments of the present disclosure are clearly and completely described in the following with reference to the accompanying drawings in the embodiments of the present disclosure. Clearly, the described embodiments are some rather than all embodiments of the present disclosure. Based on the embodiments of the present disclosure, all other embodiments obtained by a person skilled in the art without creative efforts will fall within the scope of the present disclosure.

According to some embodiments of the present disclosure, there is provided a possible application scenario, and the application scenario includes an automatic cleaning device 100, such as a self-moving robot, a mopping robot, a vacuum cleaner, and a weeder. In embodiment, as shown in FIG. 1, a household self-moving robot is used as an example for description. In a working process of the self-moving robot, a field of view image in front is obtained in real time by using an image acquisition apparatus at the front end of the self-moving robot, it is determined that whether an obstacle 200 exists or not according to analysis of the field of view image, and a traveling route of the self-moving robot is controlled according to a recognition result. In the embodiment, the robot may be provided with one or more image acquisition apparatuses to obtain an image in a process of the traveling route, and the robot may further be provided with a touch-sensitive display or controlled by a mobile terminal to receive an operation instruction input by a user. The self-moving robot may further be provided with various sensors, such as a buffer, a cliff sensor, an ultrasonic sensor, an infrared sensor, a magnetometer, an accelerometer, a gyroscope, and an odometer. The self-moving robot may further be provided with a wireless communication module such as a Wi-Fi module and a Bluetooth module to connect with an intelligent terminal or a server, and receive an operation instruction transmitted by the intelligent terminal or the server by the wireless communication module.

As shown in FIG. 2, the automatic cleaning device 100 may travel on the ground by means of various combinations of the movement relative to the following three mutually perpendicular axes defined by a body 110: a front and rear axis X, a lateral axis Y, and a central vertical axis Z. The forward drive direction along the front and rear axis X is marked as "forward", and the backward drive direction along the front and rear axis X is marked as "backward". The direction of the lateral axis Y is essentially a direction that extends between the right wheel and the left wheel of the robot along the axis defined by the center point of a drive wheel module 141.

The automatic cleaning device 100 can rotate around the Y-axis. When the forward part of the automatic cleaning device 100 is tilted upward, and the backward part is tilted downward, it is referred to as "pitch up"; and when the forward part of the automatic cleaning device 100 is tilted downward, and the backward part is tilted upward, it is referred to as "pitch down". In addition, the robot 100 may rotate around the Z-axis. In the forward direction of the automatic cleaning device 100, when the automatic cleaning device 100 is tilted to the right side of the X-axis, it is referred to as "turn right", and when the automatic cleaning device 100 is tilted to the left side of the X-axis, it is referred to as "turn right".

As shown in FIG. 3, the automatic cleaning device 100 includes a machine body 110, a sensing system 120, a control system, a drive system 140, a cleaning system, an energy system, and a human-machine interaction system 180.

The machine body 110 includes a forward part 111 and a backward part 112, and has an approximately circular shape (circular both in front and back), or may have other shapes, including but not limited to an approximately D shape with a rectangular forward part and a circular backward part, a rectangle with a rectangular forward part and a rectangular backward part, or a square shape.

As shown in FIG. 3, the sensing system 120 includes a location determination apparatus 121 on the machine body 110, a collision sensor and a proximity sensor that are disposed on a buffer 122 of the forward part 111 of the machine body 110, a cliff sensor disposed on a lower part of the machine body, and sensor apparatuses such as a magnetometer, an accelerometer, a gyro (Gyro), an odometer (ODO) that are disposed inside the machine body, which are configured to provide various pieces of location information and motion state information of the machine to the control system 130. The location determination apparatus 121 includes but is not limited to a camera and a laser direct structuring, (LDS).

As shown in FIG. 3, the forward part 111 of the machine body 110 may carry the buffer 122. In a cleaning process, when the drive wheel module 141 pushes the robot to move on the ground, the buffer 122 detects one or more events in a driving path of the automatic cleaning device 100 by using a sensor system disposed on itself, such as an infrared sensor, and the automatic cleaning device 100 may control, based on the events detected by the buffer 122 such as an obstacle or a wall, the drive wheel module 141 to enable the automatic cleaning device 100 to respond to the events, such as keeping away from the obstacle.

The control system 130 is disposed on a circuit board inside the machine body 110, and includes: a temporary memory and/or non-temporary memory, such as a hard disk, a flash memory, and a random access memory; a computing processor for communication, such as a central processing unit and an application processor. The application processor draws an instant map in an environment in which the robot is located according to obstacle information fed back by the laser range finding apparatus using a locating algorithm, such as simultaneous localization and mapping (SLAM). In addition, in combination with distance information and speed information that are fed back by the sensor apparatuses such as the sensor, the cliff sensor, the magnetometer, the accelerometer, the gyroscope, and the odometer that are disposed on the buffer 122, it can comprehensively determine a current working state and a location of the self-moving machine, as well as a current posture of the self-moving machine, such as crossing a doorsill, moving on a carpet, locating at a cliff, being stuck at the top or bottom, a dust box being full, and being picked up. In addition, a specific next action strategy is provided for different cases, so that work of the robot better meets a requirement of the owner with a better user experience.

As shown in FIG. 4, the drive system 140 may operate the robot 100 to travel across the ground based on a drive command with distance and angle information (for example, x, y, and θ components). The drive system 140 includes the drive wheel module 141. The drive wheel module 141 may control both the left wheel and the right wheel simultaneously. In order to control movement of the machine more accurately, the drive wheel module 141 preferably includes a left drive wheel module and a right drive wheel module. The left and right drive wheel modules are opposed along a lateral axis defined by the body 110. In order to enable the robot to move more stably or more strongly on the ground, the robot may include one or more driven wheels 142, and the driven wheels include but are not limited to universal wheels. The drive wheel module includes a moving wheel, a drive motor, and a control circuit for controlling the drive motor. The drive wheel module may further be connected to a circuit for measuring a drive current and an odometer. The drive wheel module 141 may be detachably connected to the body 110, so as to facilitate disassembly and repair. The drive wheel may have an offset drop suspension system, which is secured in a moveable manner, for example, attached in a rotatable manner to the robot body 110, and receives a spring offset that is an offset downward and away from the robot body 110. The spring offset allows the drive wheel to maintain contact and traction with the ground with a certain force, and a cleaning element of the automatic cleaning device 100 also contacts the ground 10 with a certain pressure.

The cleaning system may be a dry cleaning system and/or a wet cleaning system. As a dry cleaning system, a main cleaning function is derived from a cleaning system 151 formed by a roller brush, a dust box, a fan, an air outlet, and connection parts between the four. The roller brush that interferes with the ground sweeps the rubbish on the ground and rolls it to the front of a suction inlet between the roller brush and the dust box. Then, the rubbish is sucked into the dust box by gas with suction generated by the fan and passing through the dust box. The dry cleaning system may further include a side brush 152 having a rotation shaft that is angled relative to the ground to move debris into the roller brush region of the cleaning system.

An energy system includes a charging battery, such as a Ni-MEI battery and a lithium battery. The charging battery may be connected with a charging control circuit, a charging temperature detection circuit of a battery pack, and a battery under-voltage monitoring circuit. The charging control circuit, the charging temperature detection circuit of a battery pack and the battery under-voltage monitoring circuit are further connected to a single-chip microcomputer control circuit. A host is connecting to a charging pile for charging through a charging electrode disposed on a side of or below the body. If dust is attached to a bare charging electrode, a plastic body around the electrode is melted and deformed due to a charge accumulation effect during charging, which even results that the electrode itself is deformed, and the charging cannot be continued normally.

The human-machine interaction system 180 includes buttons on a host panel, and the buttons are used for the user to select a function; it may further include a display screen and/or an indicator and/or a speaker, where the display screen, the indicator, and the speaker present a current state or a function selection item of the machine to the user; and it may further include a mobile phone client program. For an automatic cleaning device of a path navigation type, it can display a map of the environment in which the device is located and a location of the machine to the user in the mobile phone client, providing more abundant and humanized function items to the user.

According to some embodiments of the present disclosure, there is provided a method for detecting an obstacle. The method is applied to the foregoing self-moving robot, in which a front image is obtained by an image acquisition apparatus disposed on the body of the self-moving robot, the image is analyzed, and then it is determined that whether an obstacle is present within the image or not, so as to control a traveling route of the self-moving robot according to a recognition result.

As shown in FIG. 5, a method for detecting an obstacle is applied to a self-moving robot, and specifically includes the following method steps. Serial numbers of the method steps do not necessarily have a sequence.

In step S502, obstacle information acquired by an image acquisition apparatus is transformed into depth information. The image acquisition apparatus may be, but is not limited to, a camera.

In 3D computer graphics and computer vision, depth information of an object is an image or an image channel that contains information related to a distance from a surface of a scene object to a viewpoint. A grayscale value of each pixel of the depth image may be used to represent a distance from a point in a scene to the image acquisition apparatus.

For example, a method for obtaining the depth information may be binocular stereoscopic vision. In the method, two images of the same scene are obtained simultaneously by two cameras that are separated by a certain distance, corresponding pixels are found in the two images by using a stereoscopic matching algorithm, and then parallax information is calculated according to a triangular principle. The parallax information may be used to represent depth information of an object in the scene through transforming. Based on the stereoscopic matching algorithm, the depth information of the scene may be further obtained by photographing a group of images at different angles in the same scene.

FIG. 6 shows a principle diagram of a binocular stereoscopic vision, OL and OR are optical centers of left and right cameras, and their optical axes and respective imaging planes are shown in FIG. 6. It is assumed that internal and external parameters of a binocular camera are the same, a focal length is f, a distance (baseline) between the optical centers is B, and the binocular camera is on the same plane, that is, Y coordinates of projection centers of the binocular camera are equal. Imaging points of a spatial point P (x, y, z) on the binocular camera at the same moment are respectively $P_{left}$ and $P_{right}$.

As shown in FIG. 7, according to the triangle similarity law:

$$\frac{z}{f} = \frac{y}{y_l} = \frac{y}{y_r} = \frac{x}{x_l} = \frac{x-b}{x_r}$$

the following formulas are obtained after transformation:

$$x = \frac{x_l * b}{x_l - x_r}, z = \frac{b * f}{x_l - x_r}, y = \frac{b}{x_l}$$

$$z = b * f/d, x = z * xl/d, y = z * y/f.$$

It may be learned from the foregoing formulas that when the focal length f of the camera, the baseline b of the left-right cameras (which may be obtained by prior information or camera calibration), and a parallax d (a relationship between a pixel (xl, yl) in the left camera and a corresponding point (xr, yr) in the right camera) are determined, a distance (depth) z of the spatial point P from the self-moving robot may be determined.

In step S504, the depth image is converted into a point cloud map, and 3D coordinate data of each reference point of the obstacle is determined. Among them, the reference point may generally refer to a point on the obstacle where a distance that can be detected, and may include but is not limited to a boundary point, a feature point, and the like on the obstacle.

Each pixel in the depth image satisfies a pixel coordinate system and an image coordinate system, and each point in the point cloud map satisfies a world coordinate system. A specific conversion principle of converting the depth image into the point cloud map is described below.

In a camera imaging process, there are four coordinate systems: a pixel coordinate system, an image coordinate system, a camera coordinate system, and a world coordinate system. As shown in FIG. 8, an upper left corner of the image is used as an origin point $O_0$ of the pixel coordinate system, and horizontal coordinates (u, v) respectively indicate numbers of the column and the row of the pixel in the image. An origin point of the image coordinate system is an intersection point between an optical axis of the camera and an image plane, and is generally the center of the image plane; the x-axis is parallel to the u-axis, and the Y-axis is parallel to the v-axis. Assuming that coordinates of $O_1$ in the pixel coordinate system $O_{0-uv}$ are $(u_0, v_0)$, and dx, dy are physical dimensions of a unit pixel on the horizontal axis and the vertical axis, there are the following relationship between the two coordinate systems:

$$\begin{cases} u = \dfrac{x}{d_x} + u_0 \\ v = \dfrac{y}{d_y} + v_0 \end{cases}.$$

A homogeneous matrix is represented as:

$$\begin{bmatrix} u \\ v \\ 1 \end{bmatrix} = \begin{bmatrix} \dfrac{1}{d_x} & 0 & u_0 \\ 0 & \dfrac{1}{d_y} & v_0 \\ 0 & 0 & 1 \end{bmatrix} \begin{bmatrix} x \\ y \\ 1 \end{bmatrix}.$$

It is further transformed to:

$$\begin{bmatrix} x \\ y \\ 1 \end{bmatrix} = \begin{bmatrix} d_x & 0 & -u_0 d_x \\ 0 & d_y & -v_0 d_y \\ 0 & 0 & 1 \end{bmatrix} \begin{bmatrix} u \\ v \\ 1 \end{bmatrix}.$$

FIG. 9 is an imaging principle diagram of the camera, O is the optical center of the camera, $z_c$ is the optical axis of the camera, and $O_1$ is an intersection point between the optical axis and the image plane. The coordinate system $O\text{-}x_c y_c z_c$ is the camera coordinate system, $Ow\text{-}x_w y_w z_w$ is the world coordinate system, and a distance between O and $O_1$ is the focal length f of the camera.

A formula transformation relationship from the camera coordinate system to the image coordinate system is as follows:

$$\begin{cases} x = f \dfrac{x_c}{z_c} \\ y = f \dfrac{y_c}{z_c} \end{cases}.$$

It is represented with a homogeneous matrix as follows:

$$s \begin{bmatrix} x \\ y \\ 1 \end{bmatrix} = \begin{bmatrix} f & 0 & 0 & 0 \\ 0 & f & 0 & 0 \\ 0 & 0 & 1 & 0 \end{bmatrix} \begin{bmatrix} x_c \\ y_c \\ z_c \\ 1 \end{bmatrix}.$$

A transformation relationship between the world coordinate system and the camera coordinate system is as follows:

$$\begin{bmatrix} x_c \\ y_c \\ z_c \\ 1 \end{bmatrix} = R \begin{bmatrix} x_w \\ y_w \\ z_w \\ 1 \end{bmatrix} + T,$$

where R is a rotation matrix, and T is a translation matrix.

It should be noted that the foregoing principle description is used only for the introductory statement, and is not used as the only solution limiting the conversion principle.

In step S506, a valid analysis range in a height direction is selected in the point cloud map.

Generally, the height of the self-moving robot is higher than 10 cm. Therefore, a laser radar device disposed at the top of the self-moving robot may only detect an obstacle with a height higher than 10 cm. Since an obstacle crossing height of the self-moving robot is 1-2 cm, a selected height range is preferably 3-9 cm. In this case, since a field of view direction of the camera is towards a moving direction of the self-moving robot during operation, a dead zone of the laser radar may be detected. In this case, 3D data points with a height range of 3-9 cm in the obtained point cloud map are analyzed, and an ideal target obstacle can be accurately obtained.

In step S508, it is analyzed that whether an obstacle is present within the valid analysis range or not, within the valid analysis range based on the coordinate data of each reference point.

As an optional specific implementation, the analyzing that whether an obstacle is present within the valid analysis range or not, within the valid analysis range based on the coordinate data of each reference point, includes the following method steps:

In step S508-2, if the coordinate data is a 3D coordinate, 3D coordinate data of each reference point in the valid analysis range may be transformed into 2D coordinate data. The specific transformation process is described above, and details are not described here again. By converting 3D point cloud data into 2D coordinate data, a data processing amount can be effectively reduced, and data processing efficiency can be improved.

In step S508-4, it is analyzed that whether an obstacle is present within the valid analysis range or not, within the valid analysis range based on the 2D coordinate data of each reference point.

As an optional specific implementation, analyzing that whether an obstacle is present within the valid analysis range or not, within the valid analysis range based on the 2D coordinate data of each reference point, includes the following sub-steps:

In step S508-4-2, a probability map formed in a traveling process of the self-moving robot is obtained.

In a moving process, the self-moving robot performs obstacle detection in real time. If an obstacle is detected, a probability value of a corresponding estimated location on the map is increased. For a part in which no obstacle is detected, a corresponding map region is calculated, and a probability value in the region is reduced.

The probability map includes current estimates of the mean and variance of system state vectors. The former indicates the nominal location of an object in the map under the world reference system. The latter indicates uncertainties of each reference point in the map and the interdependence degree of these uncertainties.

The probability map is that: in a historical moving track process of the self-moving robot, whether an obstacle is present at the location is determined by using multiple historical experiences, a location at which whether an obstacle is present is marked, and a probability value that the location is an obstacle is marked, for example, the probability value that there is an obstacle at the location is 80% or 30%. The probability map is stored in a storage apparatus of the self-moving robot, and probability data and location data are continuously updated with operation of the self-moving robot.

In step S508-4-4, coordinate data of a noise point in the 2D coordinate data of each reference point is filtered out based on the probability map, and it is analyzed that whether an obstacle is present within the valid analysis range or not based on filtered 2D coordinate data of each reference point.

As an optional specific implementation, the filtering out coordinate data of a noise point in the 2D coordinate data of each reference point based on the probability map includes the following sub-steps:

In step S508-4-4-2, location coordinate data of an obstacle in the probability map is obtained, and a probability value of the obstacle in the probability map is greater than a preset probability threshold.

In the probability map, a selected obstacle target is an obstacle target with probability value greater than a preset threshold. For example, a probability of an obstacle target A is 50%, and a probability of another obstacle target B is 60%. When the probability threshold is 55%, coordinate data of obstacle target B is considered, and obstacle target A is ignored. If an obstacle target to be selected in the probability map is determined, coordinate data of each obstacle target may be obtained, for example, denoted as B $(x_1, y_1)$.

In step S508-4-4, the location coordinate data of the obstacle is compared with the 2D coordinate data of each reference point, and the 2D coordinate data is filtered out when a distance between the location coordinate data of the obstacle and the 2D coordinate data of each reference point is greater than a preset value.

For example, a coordinate value of the obstacle target B $(x_1, y_1)$ selected from the probability map is compared with a coordinate value C $(x_0, y_0)$ of a point C in 2D data obtained by a binocular camera. When a distance between the location coordinate data of the obstacle and the 2D coordinate data of each reference point is greater than the preset value, the 2D coordinate data is filtered out. That is, when B $(x_1, y_1)$ and C $(x_0, y_0)$ are far away from each other enough, the 2D coordinate data is filtered out. In this case, it is considered that the point C $(x_0, y_0)$ is noise. Among them, the preset value may be determined according to experimental data, and is not limited here.

As an optional specific implementation, analyzing that whether an obstacle is present within the valid analysis range or not, within the valid analysis range based on the 2D coordinate data of each reference point includes the following steps:

Each reference point within the valid analysis range is clustered, and all reference points with a distance from coordinate data of an adjacent reference point less than a second preset value are determined as a region; the size of each region is determined respectively; and if the size is greater than or equal to a third preset value, it is determined that an obstacle is present within the valid analysis range.

As shown in FIG. 10, for example, in a height distance range of 3-9 cm, the distance between coordinate data of each reference point and an adjacent point in the range in the image is calculated, and all reference points with a distance value less than the second preset value are determined as a region, for example, region D, E, F, or G, and points H and K may be determined as noise points since exceeding the second preset value. The second preset value and the third preset value may be set according to a pixel size, which is not limited here.

Then, the size of each region is determined respectively; and if the size is greater than or equal to the third preset value, it is determined that an obstacle is present within the valid analysis range. The size includes at least one of: the area of each region, the diameter of each region (where, the diameter of the region is obtained when the region forms an approximately circular region), or the minimum distance across the geometric center of each region. As shown in FIG. 10, for regions D, E, F, and G, they may be determined as obstacles, each point in the region belongs to a point of an obstacle surface, and points H and K are determined as non-obstacles.

As another optional specific implementation, analyzing that whether an obstacle is present within the valid analysis range or not, within the valid analysis range based on the coordinate data of each reference point, includes the following steps:

Each reference point within the valid analysis range is clustered, and all reference points with a distance from 3D coordinate data of an adjacent point less than a fourth preset value are determined as a three-dimensional region; the size of each three-dimensional region is determined respectively; and if the size is greater than or equal to a fifth preset value, it is determined that an obstacle is present within the valid analysis range.

For example, within a height distance range of 3-9 cm, the distance between coordinate data of each reference point in the range and an adjacent point in a 3D space range is calculated, all reference points with a distance value less than the fourth preset value are determined as a region, and after all coordinate points are traversed, the size of each three-dimensional region is determined respectively; and if the size is greater than or equal to the fifth preset value, it is determined that an obstacle is present within the valid analysis range. The size includes at least one of: the volume of each region, the diameter of each region (where, the diameter of the region is obtained when the region forms an approximately circular region), the minimum distance across the geometric center of each region, and the height of the region. Among them, the fourth preset value and the fifth preset value may be set according to a pixel size, which is not limited here.

As an optional specific implementation, analyzing that whether an obstacle is present within the valid analysis range or not, includes:

In step S510, when an obstacle is present within the valid analysis range, it is determined that whether the size of the obstacle is less than a preset threshold; and when the size of the obstacle is less than the preset threshold, the self-moving robot is controlled to reduce a rotation speed of a side brush within a preset distance range from the obstacle.

According to the foregoing method steps, it may be determined whether an obstacle exists or not. Further, the size of the obstacle may be determined according to the size of the area of a region, and a preset threshold is set with reference to experimental data. The threshold may be the area of the region or a pixel quantity, and a specific threshold is not limited. When the threshold is exceeded, the obstacle is considered as a large-size obstacle, otherwise, a small-size obstacle. For a small-size obstacle, obstacle avoidance may not be performed, and the self-moving robot is controlled to reduce a rotation speed of a side brush within the preset distance range from the obstacle, so as to avoid hitting away the small-size obstacle. For a large-size obstacle, the self-moving robot is controlled to perform an obstacle avoidance operation within the preset distance range from the obstacle.

According to some embodiments of the present disclosure, there is provided a method for detecting an obstacle. In the method, a depth image in a certain height range is obtained by the self-moving robot itself, processing such as coordinate transformation and data clustering is performed on the depth image, so as to accurately determine that whether an obstacle is present within the current depth image or not. In this method, any object in a traveling route of the self-moving robot can be detected, which breaks through a limitation on types of obstacles in an existing method. In addition, a defect in a detection height of a laser device is remedied, so that a capability of detecting an obstacle by the self-moving robot is further improved, and obstacle avoidance performance of the self-moving robot is increased.

As shown in FIG. 11, According to some embodiments of the present disclosure, there is provided a method for detecting an obstacle, which is applied to a self-moving robot and includes the following method steps:

In step S1102, obstacle information acquired by an image acquisition apparatus is transformed into depth information.

The process of the step may refer to step S502 in the foregoing embodiment, and details are not described here again.

In step S1104, the depth information is converted into a point cloud map, and a valid analysis range is selected in the point cloud map.

The process of converting the depth information into a point cloud map may refer to step S504 in the foregoing embodiment. The process of selecting a valid analysis range in the point cloud map may refer to step S5011 in the foregoing embodiment. Details are not described here again.

In step S1108, it is determined that whether an obstacle is present within the valid analysis range or not, and navigation is performed according to the size of the obstacle.

As an implementation, determining that whether an obstacle is present within the valid analysis range or not, includes the following sub-steps:

In step S1108-1, each reference point within the valid analysis range is clustered.

In step S1108-2, all reference points with a distance from coordinate data of an adjacent reference point less than a second preset value are determined as a region.

In step S1108-3, the size of each region is determined respectively.

In step S1108-4, if the size of the region is greater than or equal to a third preset value, it is determined that an obstacle is present within the valid analysis range. Optionally, the size includes at least one of the following: the area/volume of each region, the diameter of each region, and the minimum distance across the geometric center of each region.

As an implementation, performing navigation according to the size of the obstacle includes: when the size range of the obstacle is less than the preset threshold, controlling the self-moving robot to reduce a rotation speed of a side brush within a preset distance range from the obstacle.

For example, for an obstacle of a relatively small size, a relatively longer obstacle avoidance distance may be selected, so as to further avoid hitting away the obstacle in a short distance. Specifically, the size of the obstacle may be determined according to the size of the area of a region, and a preset threshold is set with reference to experimental data. The threshold may be the area of the region or a pixel quantity, and a specific threshold is not limited. When the threshold is exceeded, the obstacle is considered as a large-size obstacle, otherwise, a small-size obstacle. For a small-size obstacle, obstacle avoidance may not be performed, and the self-moving robot is controlled to reduce a rotation speed of a side brush within the preset distance range from the obstacle, so as to avoid hitting away the small-size obstacle.

As an implementation, performing navigation according to the size of the obstacle further includes: determining an obstacle avoidance distance according to the size of the obstacle or a range in which the size is located, and controlling the self-moving robot to start to perform an obstacle avoidance strategy at the obstacle avoidance distance.

For a large-size obstacle that exceeds the preset threshold, the self-moving robot is controlled to perform an obstacle avoidance operation within the preset distance range from the obstacle. Generally, the larger the size of the determined obstacle, the smaller the distance at which the obstacle avoidance starts to be performed. It is because that, the larger the obstacle, the less affected by the side brush, and the moving robot may even move along the obstacle.

As an implementation, performing navigation according to the size of the obstacle specifically includes: if it is determined that the height of the obstacle is greater than a preset height, performing an obstacle avoidance strategy. In this way, only an obstacle with a height exceeding a certain value needs to be avoided. If the height is small, it may be selected to directly cross the obstacle, so as to further reduce a sweeping missing region.

As shown in FIG. 12, According to some embodiments of the present disclosure, there is provided an apparatus for detecting an obstacle, configured to implement the method steps described in the foregoing embodiments. For the same method steps, technical effects are the same. Details are not described here. Specifically, the apparatus for detecting an obstacle includes:

a transformation unit 1202, configured to transform obstacle information acquired by an image acquisition apparatus into depth information;

a conversion unit 1204, configured to convert the depth information into a point cloud map, and determine coordinate data of each reference point of the obstacle;

a determination unit 1206, configured to select a valid analysis range in the height direction in the point cloud map; and an analysis unit 1208, configured to analyze, within the valid analysis range based on the coordinate data of each reference point, that whether an obstacle is present within the valid analysis range or not.

Optionally, the analysis unit 1208 is further configured to: transform 3D coordinate data of each reference point within the valid analysis range into 2D coordinate data; and analyze, within the valid analysis range based on the 2D coordinate data of each reference point, that whether an obstacle is present within the valid analysis range or not.

Optionally, the analysis unit 1208 is further configured to: obtain a probability map formed in a traveling process of the self-moving robot; filter out coordinate data of a noise point in the 2D coordinate data of each reference point based on the probability map, and analyze, based on filtered 2D coordinate data of each reference point, that whether an obstacle is present within the valid analysis range or not.

Optionally, the analysis unit 1208 is further configured to: obtain location coordinate data of an obstacle in the probability map, where a probability value of the obstacle in the probability map is greater than a preset probability threshold; compare the location coordinate data of the obstacle with the 2D coordinate data of each reference point, and filter out the 2D coordinate data when a distance between the location coordinate data of the obstacle and the 2D coordinate data of each reference point is greater than a preset value.

Optionally, the analysis unit 1208 is further configured to cluster each reference point within the valid analysis range, and determine all reference points with a distance from coordinate data of an adjacent point less than a second preset value as a region; determine the size of each region respectively; and if the size is greater than or equal to a third preset value, determine that an obstacle is present within the valid analysis range. The size includes at least one of the following: the area/volume of each region, the diameter of each region, and the minimum distance across the geometric center of each region.

The apparatus further includes: a control unit (not shown), configured to: determine that whether the size range of the obstacle is less than a preset threshold or not, when an obstacle is present within the valid analysis range; control the self-moving robot to reduce a rotation speed of a side brush within a preset distance range from the obstacle, when the size range of the obstacle is less than the preset threshold; and control the self-moving robot to perform an obstacle avoidance operation within the preset distance range from the obstacle, when the size range of the obstacle is greater than or equal to the preset threshold.

According to some embodiments of the present disclosure, there is provided an apparatus for detecting an obstacle. A depth image within a certain height range of the self-moving robot is obtained by a binocular camera of a self-moving robot. Then processing such as coordinate transformation and data clustering is performed on the depth image, so as to accurately determine that whether an obstacle is present within the current depth image or not. In this method, any object in a traveling route of the self-moving robot can be detected, which breaks through a limitation on types of obstacles in an existing method. In addition, a defect in a detection height of a laser device is remedied, so that a capability of detecting an obstacle by the self-moving robot is further improved, and obstacle avoidance performance of the self-moving robot is increased.

As shown in FIG. 13, According to some embodiments of the present disclosure, there is provided an apparatus for detecting an obstacle, configured to implement the method steps described in the foregoing embodiment. For the same method steps, technical effects are the same. Details are not described here. Specifically, the apparatus for detecting an obstacle includes:

an image transformation unit 1302, configured to: transform obstacle information acquired by an image acquisition apparatus into depth information;

an image conversion unit 1304, configured to: convert the depth image into a point cloud map, and determine coordinate data of each reference point on the obstacle;

a range selection unit 1306, configured to select a valid analysis range in the point cloud map; and a navigation performing unit 1308, configured to: determine whether an obstacle is present within the valid analysis range, and perform navigation according to the size of the obstacle.

As an implementation, the navigation performing unit 1308 is further configured to: cluster each reference point within the valid analysis range, and determine all reference points with a distance from coordinate data of an adjacent point less than a second preset value as a region; determine the size of each region respectively; and if the size of the region is greater than or equal to a third preset value, determine that an obstacle is present within the valid analysis range. Optionally, the size includes at least one of the following: the area/volume of each region, the diameter of each region, the minimum distance across the geometric center of each region, or the height of the region.

As an implementation, performing navigation according to the size of the obstacle includes: when the size range of the obstacle is less than the preset threshold, controlling the self-moving robot to reduce a rotation speed of a side brush within a preset distance range from the obstacle.

As an implementation, performing navigation according to the size of the obstacle further includes: determining an obstacle avoidance distance according to the size of the obstacle or a range in which the size is located, and controlling the self-moving robot to start to perform an obstacle avoidance strategy at the obstacle avoidance distance.

According to some embodiments of the present disclosure, there is provided a non-transitory computer readable storage medium, where a computer program instruction is stored, and when the computer program instruction is invoked and executed by a processor, the foregoing method steps are implemented.

According to some embodiments of the present disclosure, there is provided a robot, including a processor and a memory, where the memory stores with a computer program instruction that can be executed by the processor, and when the processor executes the computer program instruction, the method steps of any of the foregoing embodiments are implemented.

As shown in FIG. 14, the robot may include a processing apparatus (such as a central processing unit, a graphics processing unit, or the like) 1401 that may perform various appropriate actions and processing according to a program stored in a read-only memory (ROM) 1402 or a program loaded from a storage apparatus 1408 into a random access memory (RAM) 1403. In the RAM 1403, various programs and data required for operation of an electronic robot 1400 are further stored. The processing apparatus 1401, the ROM 1402, and the RAM 1403 are connected to each other through a bus 1404. An input/output (I/O) interface 1405 is also connected to the bus 1404.

Generally, the following apparatuses may be connected to the I/O interface 1405: input apparatuses 1406 including, for example, a touchscreen, a touchpad, a keyboard, a mouse, a camera, a microphone, an accelerometer, and a gyroscope; output apparatuses 1407 including, for example, a liquid crystal display (LCD), a loudspeaker and a vibrator; storage apparatuses 1408 including, for example, a hard disk; and a communication apparatus 1409. The communication apparatus 1409 may allow the electronic robot to communicate wirelessly or wired with another robot to exchange data. Although FIG. 14 shows an electronic robot with various apparatuses, it should be understood that it is not required to implement or provide all shown apparatuses. Alternatively, more or fewer apparatuses may be implemented or provided.

In particular, according to the embodiments of the present disclosure, the process described above with reference to the flowchart may be implemented as a software program of the robot. For example, an embodiment of the present disclosure includes a robot software program product that includes a computer program carried on a readable medium, and the computer program includes program code used to perform the method shown in the flowchart. In such an embodiment, the computer program may be downloaded and installed from a network by the communication apparatus 1409, or installed from the storage apparatus 1408, or installed from the ROM 1402. When the computer program is executed by the processing apparatus 1401, the foregoing functions defined in the method in the embodiments of the present disclosure are executed.

It should be noted that the foregoing computer readable medium in the present disclosure may be a computer readable signal medium, a computer readable storage medium, or any combination of the two. The computer readable storage medium may be, for example, an electrical, magnetic, optical, electromagnetic, infrared, or semiconductor system, apparatus, or device, or any combination of them. More specific examples of the computer readable storage medium may include but are not limited to: an electrical connection having one or more conducting wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of them. In the present disclosure, the computer readable storage medium may be any tangible medium that includes or stores with a program, and the program may be used by or in combination with an instruction execution system, apparatus, or device. In the present disclosure, the computer readable signal medium may include a data signal propagated in a baseband or as a part of a carrier, which carries computer readable program code. Such a propagated data signal may be in multiple forms, including but not limited to an electromagnetic signal, an optical signal, or any suitable combination of them. The computer readable signal medium may further be any computer readable medium other than the computer readable storage medium, and the computer readable signal medium may send, propagate, or transmit a program that is used by or in combination with an instruction execution system, apparatus, or device. The program code included in the computer readable medium may be transmitted using any suitable medium, including but not limited to: a wire, an optical cable, a radio frequency (RF), or any suitable combination of them The computer readable medium may be included in the foregoing robot, or may exist separately and not be assembled into the robot.

Computer program code for performing the operations of the present disclosure may be written in one or more programming languages or a combination of them. The programming languages include object-oriented programming languages, such as Java, Smalltalk, C++, and further include conventional procedural programming languages such as "C" or similar program design languages. The program code may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, be connected through the Internet using an Internet service provider).

Flowcharts and block diagrams in the accompanying drawings illustrate possible architectures, functions, and operations of systems, methods, and computer program products according to various embodiments of the present disclosure. In this regard, each block in a flowchart or block diagram may represent a module, program segment, or part of code that includes one or more executable instructions for implementing a specified logical function. It should also be noted that in some alternative implementations, functions marked in the block may also occur in different order from those marked in the accompanying drawings. For example, two blocks represented in succession may actually be executed in substantially parallel, and they may sometimes be executed in a reverse order, depending on the functions involved. It should also be noted that each block in the block diagram and/or flowchart and a combination of blocks in the block diagram and/or flowchart may be implemented by using a dedicated hardware-based system that performs a specified function or operation, or may be implemented by using a combination of dedicated hardware and a computer instruction.

The apparatus embodiment described above is merely an example. Among them, the units described as separate components can or cannot be physically separate, and components displayed as units can or cannot be physical units, can be located in one location, or can be distributed on a plurality of network units. Some or all of the modules can be selected based on an actual need to implement the solutions of the embodiments. A person of ordinary skill in the art can understand and implement the embodiments of the present application without creative efforts.

Finally, it should be noted that the above embodiments are merely intended for describing the technical solutions of the present disclosure, but not limiting the present disclosure. Although the present disclosure is described in detail with reference to the above embodiments, a person of ordinary skill in the art should understand that modifications still can be made to the technical solutions described in the above embodiments or equivalent replacements can be made to some technical features of them, without departing from the spirit and scope of the technical solutions of the embodiments of the present disclosure.

What is claimed is:

1. A method for detecting an obstacle performed by a self-moving robot, comprising:

transforming obstacle information into depth information;

converting the depth information into a point cloud map, and determining coordinate data of a reference point on the obstacle;

determining a valid analysis range in a height direction in the point cloud map;

determining, based on the coordinate data of the reference point, whether an obstacle is present within the valid analysis range;

in response to determining that the obstacle is present within the valid analysis range, determining whether a size of the obstacle is less than a preset threshold;

in response to the size of the obstacle being less than the preset threshold, controlling the self-moving robot to reduce a rotation speed within a preset distance range from the obstacle; and wherein the determining, based on the coordinate data of the reference point, whether the obstacle is present within the valid analysis range comprises:

transforming 3D coordinate data of the reference point within the valid analysis range into 2D coordinate data; and determining, based on the 2D coordinate data of the reference point, whether the obstacle is present within the valid analysis range.

2. The method according to claim 1, wherein the determining, based on the 2D coordinate data of the reference point, whether the obstacle is present within the valid analysis range, further comprises:

obtaining a probability map formed in a traveling process of the self-moving robot; and filtering out coordinate data of a noise point in the 2D coordinate data of each reference point based on the probability map.

3. The method according to claim 2, wherein the filtering out the coordinate data of the noise point in the 2D coordinate data of the reference point based on the probability map comprises:

obtaining location coordinate data of the obstacle in the probability map, wherein a probability value of the obstacle in the probability map is greater than a preset probability threshold; and comparing the location coordinate data of the obstacle with the 2D coordinate data of the reference point, and filtering out the 2D coordinate data in response to determining that a distance between the location coordinate data of the obstacle and the 2D coordinate data of the reference point is greater than a first preset value.

4. The method according to claim 1, wherein the determining, based on the coordinate data of the reference point, whether the obstacle is present within the valid analysis range comprises:

clustering the reference point within the valid analysis range, and determining all reference points with a distance from coordinate data of an adjacent reference point less than a second preset value as a region; and determining a size of the region respectively, and in response to the size of the region being greater than or equal to a third preset value, determining that the obstacle is present within the valid analysis range.

5. The method according to claim 4, wherein the size of the region comprises at least one of the following:

an area/volume of the region, a diameter of the region, or a minimum distance across a geometric center of the region.

6. A non-transitory computer readable storage medium, wherein a computer program instruction is stored, and when the computer program instruction is invoked and executed by a processor, steps of the method according to claim 1 are implemented.

7. A method for detecting an obstacle, performed by a self-moving robot, comprising:

transforming obstacle information into depth information;

converting the depth information into a point cloud map, and selecting a valid analysis range in the point cloud map;

in response to determining that an obstacle is present within the valid analysis range, performing navigation according to a size of the obstacle; and wherein the performing navigation according to the size of the obstacle comprises:

in response to determining that the size of the obstacle is less than a preset threshold, controlling the self-moving robot to reduce a rotation speed within a preset distance range from the obstacle; and wherein the determining that the obstacle is present within the valid analysis range comprises:

transforming 3D coordinate data of the reference point within the valid analysis range into 2D coordinate data; and determining, based on the 2D coordinate data of the reference point, whether the obstacle is present within the valid analysis range.

8. The method according to claim 7, wherein the performing navigation according to the size of the obstacle comprises:

determining an obstacle avoidance distance according to the size of the obstacle or a range of the size, and controlling the self-moving robot to start to perform an obstacle avoidance strategy at the obstacle avoidance distance.

9. The method according to claim 7, further comprising:

determining coordinate data of a reference point on the obstacle;

clustering the reference point within the valid analysis range, and determining all reference points with a distance from coordinate data of an adjacent reference point less than a second preset value as a region;

determining a size of the region respectively; and in response to the size of the region being greater than or equal to a third preset value, determining that the obstacle is present within the valid analysis range.

10. The method according to claim 9, wherein the size of the region comprises at least one of the following:

an area/volume of the region, a diameter of the region, a minimum distance across a geometric center of the region, or a height of the region.

11. The method according to claim 10, wherein, the performing navigation according to the size of the obstacle comprises:

in response to determining that a height of the obstacle is greater than a preset height, performing an obstacle avoidance strategy.

12. A self-moving robot, comprising a processor and a memory, wherein the memory stores with a computer program instruction executable by the processor, and when the processor executes the computer program instruction, steps of the method according to claim 7 are implemented.

13. A non-transitory computer readable storage medium, wherein a computer program instruction is stored, and when the computer program instruction is invoked and executed by a processor, steps of the method according to claim 7 are implemented.

14. A self-moving robot, comprising a processor and a memory, wherein the memory stores with a computer program instruction executable by the processor, and when the processor executes the computer program instruction, the processor is configured to:

transform obstacle information into depth information;

convert the depth information into a point cloud map, and determine coordinate data of a reference point on the obstacle;

determine a valid analysis range in a height direction in the point cloud map; and determine, based on the coordinate data of the reference point, whether an obstacle is present within the valid analysis range;

in response to determining that the obstacle is present within the valid analysis range, determine whether a size of the obstacle is less than a preset threshold; and in response to the size of the obstacle being less than the preset threshold, control the self-moving robot to reduce a rotation speed within a preset distance range from the obstacle;

wherein the processor is further configured to:

transform 3D coordinate data of the reference point within the valid analysis range into 2D coordinate data; and determine, based on the 2D coordinate data of the reference point, whether the obstacle is present within the valid analysis range.

15. The self-moving robot according to claim 14, the processor is further configured to:

cluster the reference point within the valid analysis range, and determine all reference points with a distance from coordinate data of an adjacent reference point less than a second preset value as a region; and determine a size of the region respectively, and in response to a size of the region being greater than or equal to a third preset value, determine that the obstacle is present within the valid analysis range.

* * * * *